(12) United States Patent
Nessel et al.

(10) Patent No.: US 7,178,205 B2
(45) Date of Patent: Feb. 20, 2007

(54) MULTIPLE ENGAGEMENT JOINT TETHERED FASTENER

(75) Inventors: Rosalind A Nessel, Birmingham, MI (US); Steven M Benedetti, Sterling Heights, MI (US); Jeff A Slobodecki, Wales, MI (US)

(73) Assignee: Newfrey LLC, Newark, DE (US)

( * ) Notice: Subject to any disclaimer, the term of this patent is extended or adjusted under 35 U.S.C. 154(b) by 198 days.

(21) Appl. No.: 10/915,028

(22) Filed: Aug. 10, 2004

(65) Prior Publication Data

US 2006/0032029 A1 Feb. 16, 2006

(51) Int. Cl.
*A44B 17/00* (2006.01)
(52) U.S. Cl. .............. 24/289; 24/298; 24/297; 24/457; 24/458
(58) Field of Classification Search .......... 24/289, 24/297, 295, 457, 458, 326
See application file for complete search history.

(56) References Cited

U.S. PATENT DOCUMENTS

| 1,270,494 | A | 6/1918 | Christiansen |
| 3,508,303 | A | 4/1970 | Miyasaka |
| 4,250,599 | A | * 2/1981 | Nagashima et al. .......... 24/326 |
| 5,150,919 | A | 9/1992 | Sakakida et al. |
| 5,398,960 | A | 3/1995 | Ravenberg et al. |
| 5,403,034 | A | 4/1995 | Gans et al. |
| 5,533,237 | A | * 7/1996 | Higgins ...................... 24/289 |
| 5,647,607 | A | 7/1997 | Bolieau |
| 5,651,562 | A | 7/1997 | Hagen et al. |
| 5,791,683 | A | 8/1998 | Shibata et al. |
| 5,813,693 | A | 9/1998 | Gordon et al. |
| 6,053,527 | A | 4/2000 | Gans et al. |
| 6,145,870 | A | 11/2000 | Devane et al. |
| 6,402,188 | B1 | 6/2002 | Pasch |
| 6,431,585 | B1 | * 8/2002 | Rickabus et al. ........ 280/728.3 |
| RE38,125 | E | 5/2003 | Shibata et al. |
| 6,565,116 | B1 | 5/2003 | Tajima et al. |
| 6,715,185 | B2 | * 4/2004 | Angellotti .................... 24/297 |
| 2002/0125705 | A1 | 9/2002 | Wong et al. |
| 2003/0178832 | A1 | 9/2003 | Dorminissini et al. |
| 2003/0222435 | A1 | 12/2003 | Schmidt et al. |

* cited by examiner

*Primary Examiner*—Marcus Menezes
(74) *Attorney, Agent, or Firm*—Harness, Dickey & Pierce, P.L.C.

(57) ABSTRACT

A fastener first member connects to a second member by a flexible tether. A third member having multiple deflectable wings slides onto the second member. A first member male pin extends through a third member aperture to engage second member biasing elements, joining the first, second and third members.

25 Claims, 11 Drawing Sheets

MULTIPLE ENGAGEMENT JOINT TETHERED FASTENER

FIELD OF THE INVENTION

The present invention relates in general to clip type fasteners and more specifically to a device and methods for creating and using a clip type fastener assembly to join automobile vehicle component parts.

BACKGROUND OF THE INVENTION

For automotive applications, fasteners are used to join trim pieces to sections or metal body portions of the automobile. The requirements for these fasteners are that they be insertable into apertures of the automobile and meet requirements to both retain the trim piece as well as provide a minimum pullout retention force such that the trim piece can be removed to replace a damaged trim piece. In the event that an air bag has deployed which requires replacement of the air bag and/or the trim piece supporting the air bag, the fasteners need to be removable. Common fastener designs include directly opposed flexible wings which deflect inwardly upon insertion of the fastener and expand by spring force to hold the fastener within a rectangular slot in the automobile. These fasteners are typically intended to be at least semi-permanent. A drawback of commonly used fasteners is the lack of an accessible fastener joint to remove the fastener/trim piece for easy replacement following damage or an air bag deployment event.

Further drawbacks of existing designs include additional parts such as screws, malfunction problems between screws and metal, installation or removal labor required, beauty-cap requirements, lack of color match, a driver tool over-powering the metal/screw, high tooling cost, improper fitup causing loose components, and lack of ability to disengage from the trim when housing a full size air curtain.

SUMMARY OF THE INVENTION

According to a preferred embodiment of the present invention, a fastener first member connects to a second member by a flexible tether. A third member having multiple deflectable wings slides onto the second member. A first member male pin extends through a third member aperture to engage second member biasing elements, joining the first, second and third members.

According to another aspect of the present invention, a fastener system includes first, second and third members. Each of the members when joined together connect a vehicle component part to a vehicle panel. The joined connections are distinguishable in a sequential order of connection strength such that the connections disconnect in the order of their connection strength.

According to still another aspect of the present invention, a method for fastening component parts of an automobile is provided. In yet another aspect of the present invention, a method for creating a multiple part clip fastener is provided.

A multiple engagement joint tethered fastener of the present invention offers several advantages. The features, functions, and advantages can be achieved independently in various aspects of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
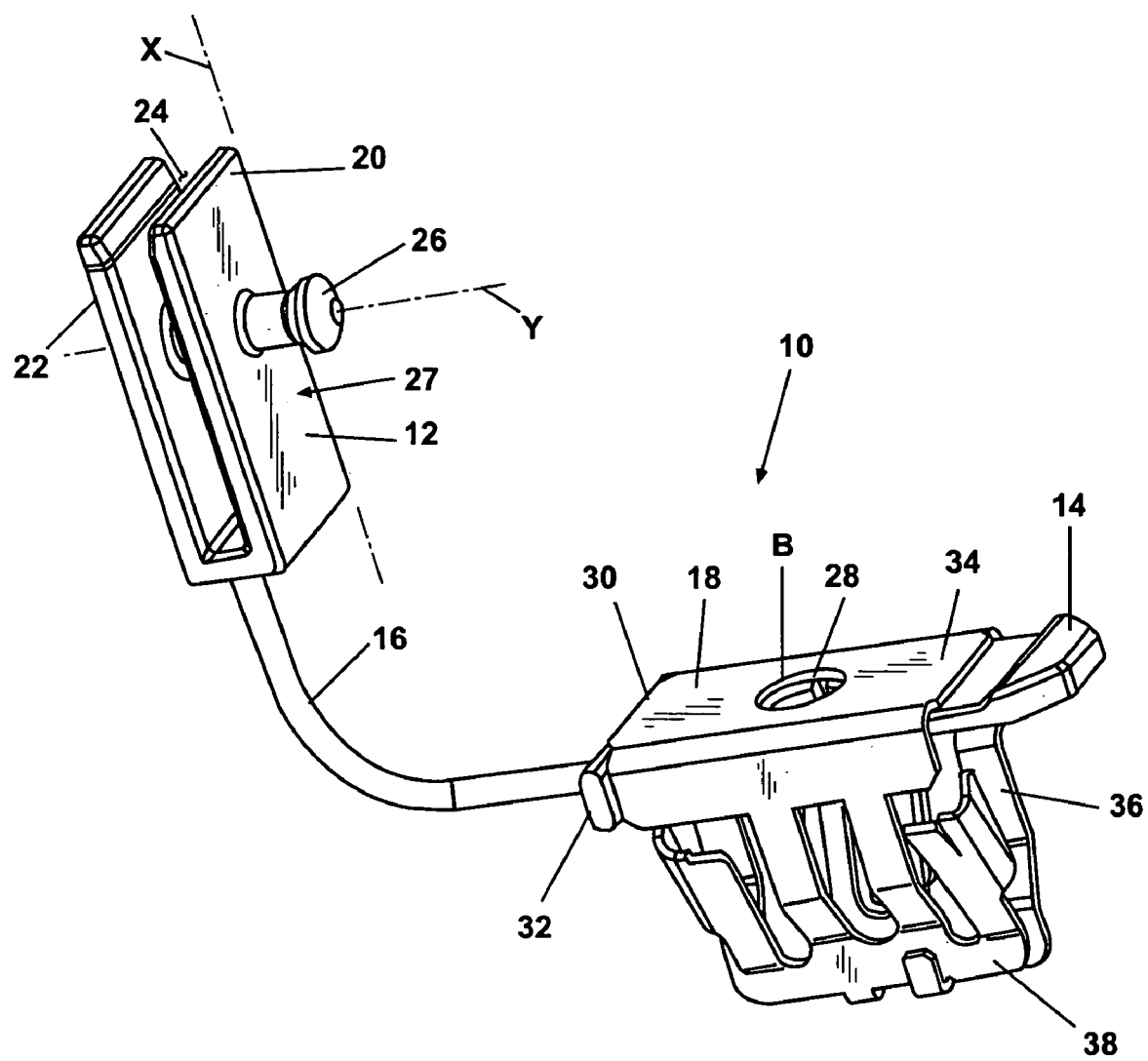
FIG. 1 is a perspective view of a partially assembled 3-way connecting tethered fastener according to a preferred embodiment of the present invention.

Referring generally to FIG. 1 and according to a preferred embodiment of the present invention, a three-way connecting tethered fastener of the present invention includes a fastener assembly 10 having a connector 12 joined to an engagement member 14 by a flexible element 16. A metal clip 18 is slidably engaged with engagement member 14 to pre-assemble fastener assembly 10.

Connector 12 is substantially U-shaped and includes a first planar portion 20 and a second planar portion 22. First and second planar portions 20 and 22 are arranged substantially parallel to each other and define a slot 24 between first planar portion 20 and second planar portion 22. A pin 26 defines a longitudinal axis "Y" which is oriented substantially perpendicular to a plane "X" defined by first face 27. Pin 26 is sized to be slidably received within an aperture 28 created in metal clip 18.

Metal clip 18 includes an abutment end 30 which engages a shoulder 32 of engagement member 14. Metal clip 18 further includes a mounting plate 34 through which aperture 28 is formed. Mounting plate 34 integrally includes each of a first contact side 36 and a second contact side 38. First and second contact sides 36 and 38 extend substantially transverse to mounting plate 34.

Figure 2:
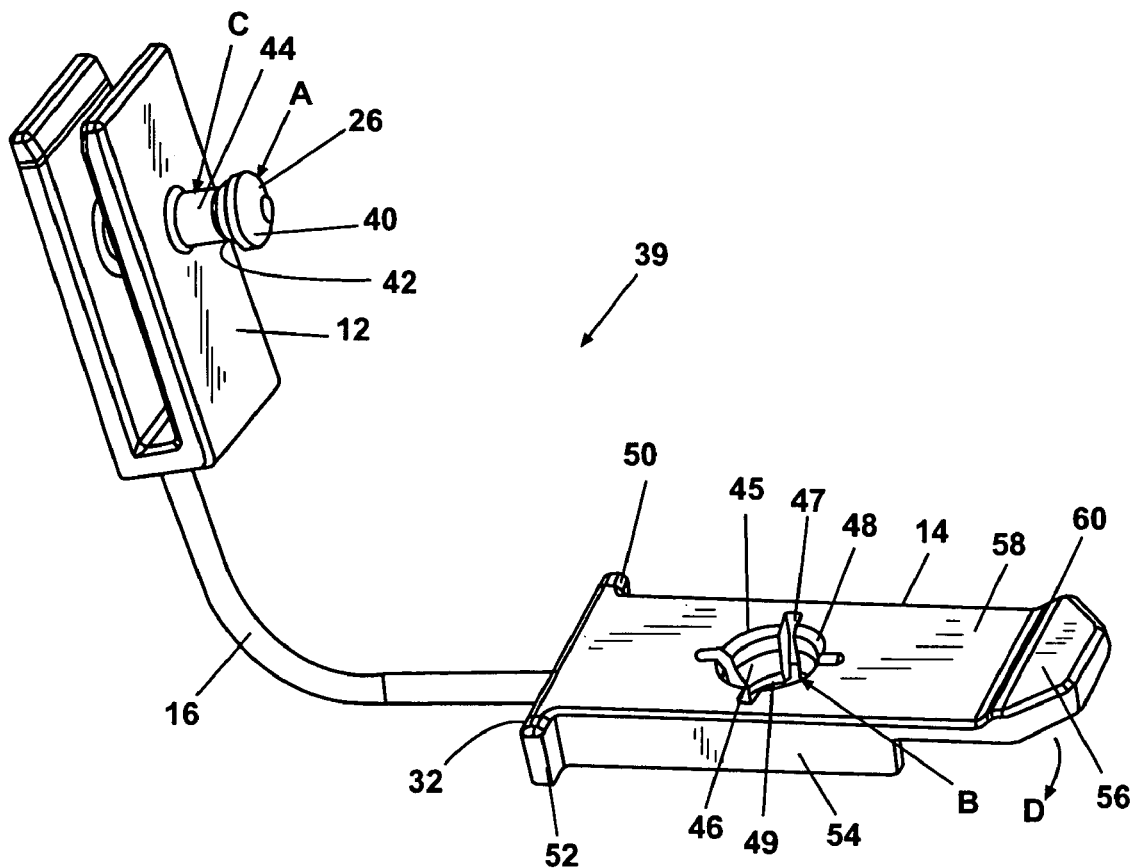
FIG. 2 is a perspective view of the tether-connected component parts of the fastener of FIG. 1.

Referring now to FIG. 2, an integrally connected sub-assembly 39 includes connector 12, engagement member 14 and flexible element 16. Pin 26 includes a bulbous head 40 having a head diameter "A". Head 40 is connected by a taper portion 42 to a stem 44. Stem 44 includes a stem diameter "C" which is smaller than head diameter "A". Head diameter "A" of pin 26 is sized to clear a head clearance diameter "B" of aperture 28 formed in metal clip 18 (shown in FIG. 1). Head diameter "A" of pin 26 is further sized to releasably engage within a stepped member 45 formed in engagement member 14. Stepped member 45 provides a major diameter equivalent to head clearance diameter "B" which provides diametrical clearance for head 40. Stepped member 45 also includes a plurality of stepped deflecting members 46 separated from one another by a plurality of channels 47. Each stepped deflecting member 46 includes a beveled contact surface 48 and an engagement surface 49. Head 40 of pin 26 elastically deflects each stepped deflecting member 46 as head 40 is inserted into stepped member 45. When head 40 extends beyond engagement surfaces 49, the elastic bias force of stepped deflecting members 46 direct engagement surfaces 49 into contact with taper portion 42 of stem 44 to releasably engage connector 12 to engagement member 14 through metal clip 18.

Engagement member 14 includes shoulder 32 at a first end having each of a first engagement shoulder 50 and a second engagement shoulder 52 transversely extending beyond each of a pair of side walls 54 (only 1 side wall 54 is visible in this view). A deflectable end 56 is positioned opposite to shoulder 32. Deflectable end 56 is connected to an extension member 58 by an inclined portion 60. Extension member 58 elastically deflects to allow deflectable end 56 to rotate about an arc "D" (a non-deflected condition of deflectable end 56 is shown). A primary purpose for inclined portion 60 is to engage mounting plate-34 of metal clip 18 (shown in FIG. 1) such that metal clip 18 is releasably retained between inclined portion 60 and shoulder 32.

Figure 3:
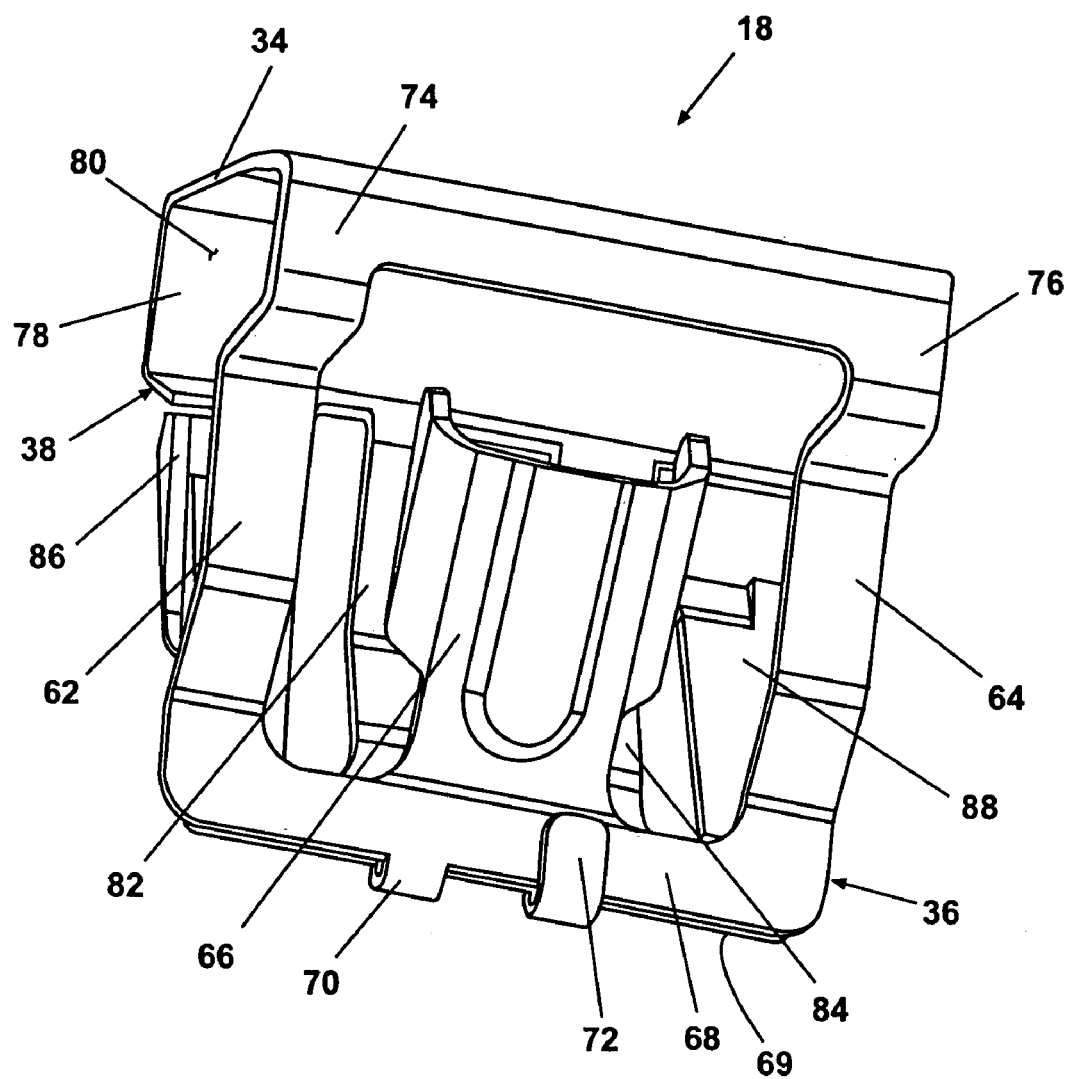
FIG. 3 is a perspective view of the metal clip portion of the fastener of FIG. 1.

As best seen in FIG. 3, first contact side 36 and second contact side 38 of metal clip 18 extend generally transversely from mounting plate 34. First contact side 36 includes a first exterior frame section 62, a second exterior frame section 64, and at least one first deflectable wing 66 integrally connectable to a cross member 68 distally extending from mounting plate 34. Cross member 68 is coupled to a cross member 69 of second contact side 38 by a first retaining tab 70 integrally formed with cross member 68 and a second retaining tab 72 integrally formed with cross member 69. Each of first retaining tab 70 and second retaining tab 72 are deformed such that they interlock as shown with the opposed cross member 68 or 69.

First exterior frame section 62 is integrally connected to mounting plate 34 by a first side wall 74. Similarly, second exterior frame section 64 is integrally connected to mounting plate 34 by a second side wall 76. First side wall 74 and second side wall 76 each oppose a third side wall 78 integrally connected to second contact side 38. A receiving channel 80 is defined between first side wall 74, second side wall 76, and third side wall 78. Receiving channel 80 is configured to slidably receive deflectable end 56 (shown in FIG. 2) of engagement member 14 when assembled as shown in FIG. 1. Second contact side 38 further includes a first interior frame section 82 and a second interior frame section 84 which are similar to first exterior frame section 62 and second exterior frame section 64. Second contact side 38 also includes at least two deflectable wings which are positioned opposite to first deflectable wing 66, including a second deflectable wing 86 and a third deflectable wing 88.

Figure 4:
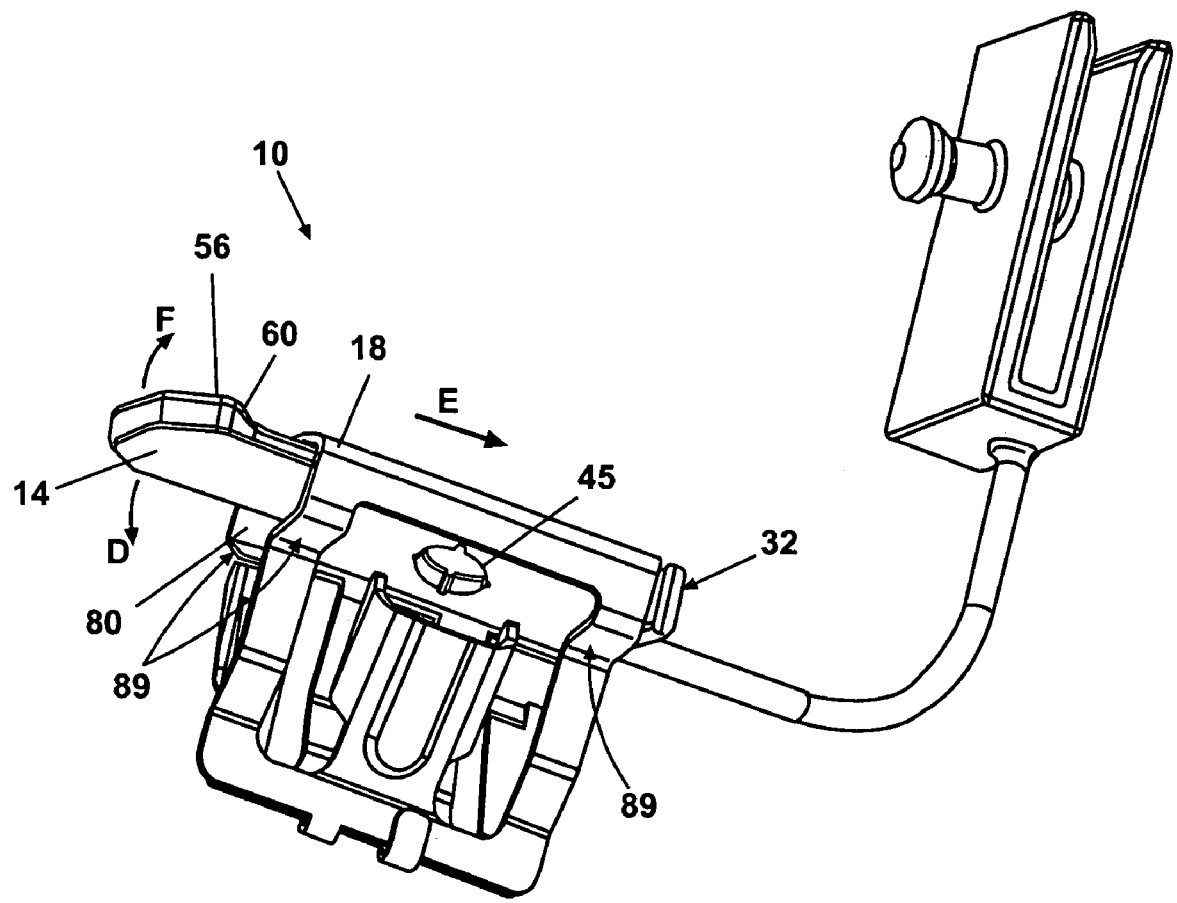
FIG. 4 is a perspective view of the fastener of FIG. 1 rotated to show the assembly of the metal clip portion.

Referring now to FIG. 4, metal clip 18 is slidably engaged with engagement member 14 of sub-assembly 39. This is accomplished by elastically deflecting deflectable end 56 of extension member 58 about arc "D" and sliding metal clip 18 over both deflectable end 56 and extension member 58 in an insertion direction "E" until metal clip 18 engages shoulder 32 of engagement member 14. Thereafter, deflectable end 56 of extension member 58 elastically springs back in a direction opposite to arc "D" such that engagement member 14 releasably restrains metal clip 18 between inclined portion 60 of deflectable end 56 and shoulder 32. Stepped member 45 is substantially coaxially aligned with aperture 28 at this time. A plurality of plate engagement members 89 are visible in this view.

Figure 5:
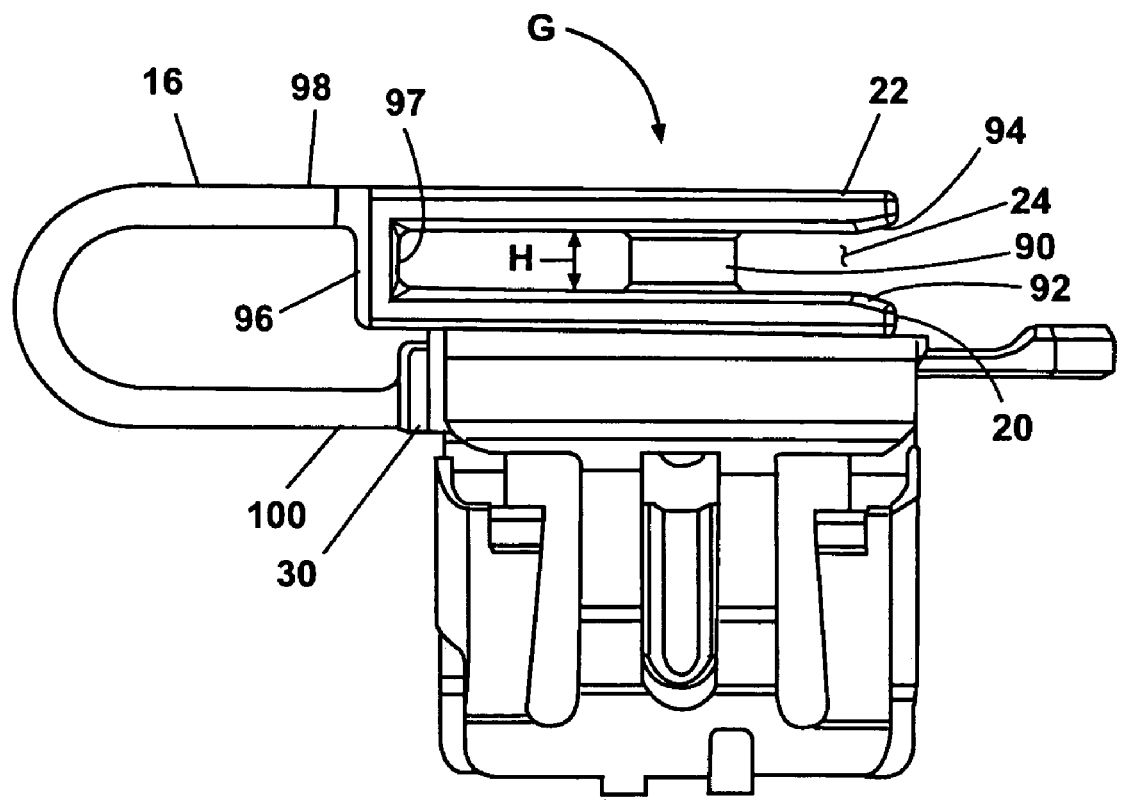
FIG. 5 is a side elevational view of an assembled fastener of the present invention in a 3-way connected condition.

As best seen in FIG. 5, each of the three main component parts of fastener assembly 10 of the present invention are shown in an assembled condition. Metal clip 18 is slidably engaged with engagement member 14 as described in reference to FIG. 4. Connector 12 is rotated in an assembly direction "G" such that pin 26 engages stepped member 45 (not clearly visible in this view). Further details of fastener assembly 10 are also visible in this view. A column 90 integrally joined between first planar portion 20 and second planar portion 22 maintains a standoff distance "H" for slot 24. A first beveled edge 92 and a second beveled edge 94 are provided for each of first planar portion 20 and second planar portion 22, respectively at an inlet of slot 24. First beveled edge 92 and second beveled edge 94 are provided to simplify alignment between slot 24 and a doghouse assembly (shown and described in reference to FIG. 6). A joining end 96 is also provided at a distal end of each of first planar portion 20 and second planar portion 22. Joining end 96 also provides an engagement face 97. Flexible element 16 is integrally joined to joining end 96 at a first end 98. Flexible element 16 is integrally joined to abutment end 30 of engagement member 14 at a second end 100.

Figure 6:
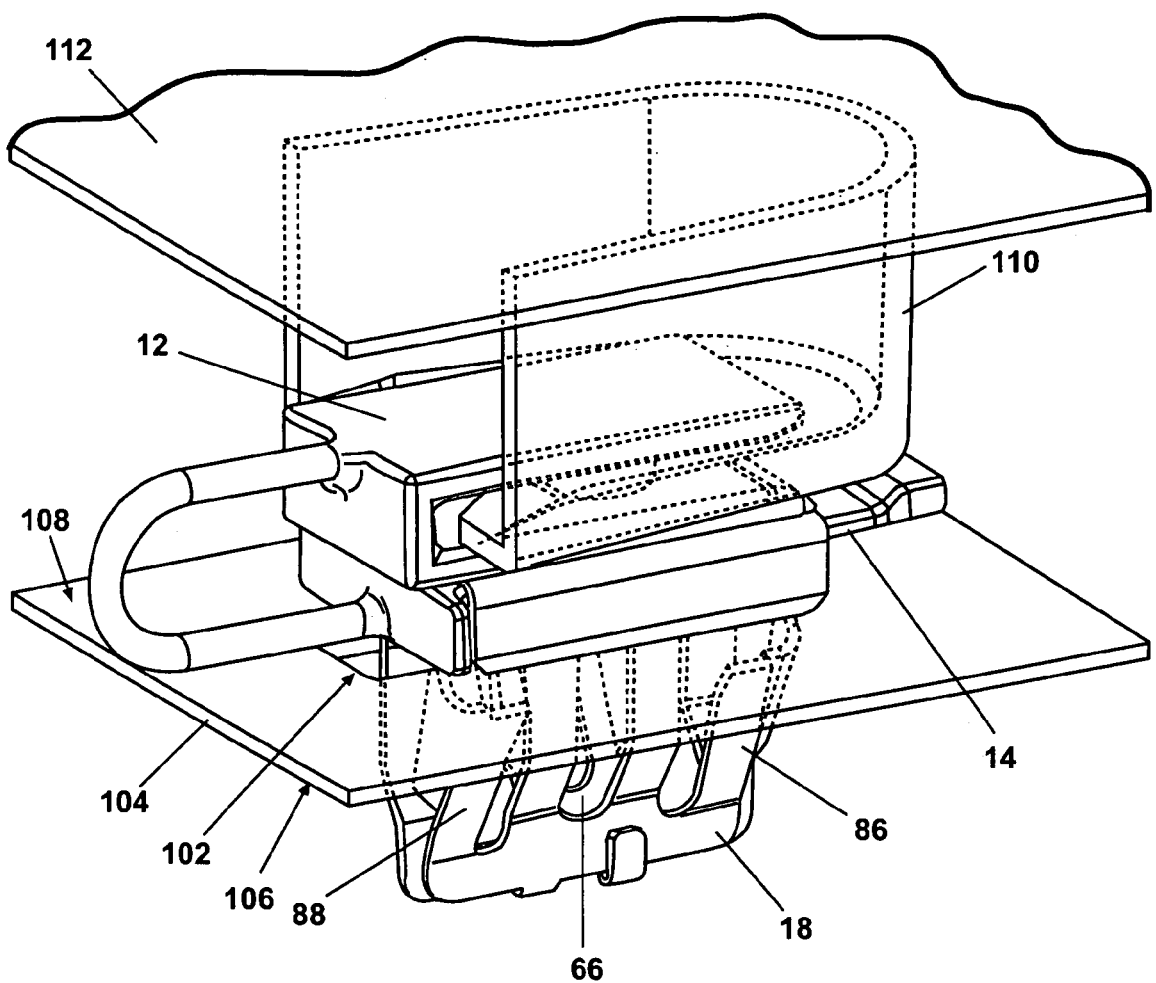
FIG. 6 is a perspective view of the assembled fastener of FIG. 5 when joining component parts of an automobile vehicle.

Referring generally to FIG. 6, a functionally joined fastener assembly 10 is described. Each of first contact side 36 and second contact side 38 of metal clip 18 are slidably inserted into an aperture 102 formed within a vehicle panel 104. Each of first deflectable wing 66, second deflectable wing 86 and third deflectable wing 88 deflect upon insertion into aperture 102 and elastically return to a non-deflected or expanded state following insertion. First deflectable wing 66, second deflectable wing 86, and third deflectable wing 88 engage a first surface 106 of panel 104, while the plurality of plate engagement members 89 (shown in FIG. 4) engage an opposed or second surface 108 of panel 104. A doghouse 110 is slidably received within slot 24 of connector 12. Doghouse 110 is matably connected to a component part 112 such as a trim piece for an automobile vehicle.

Figure 7:
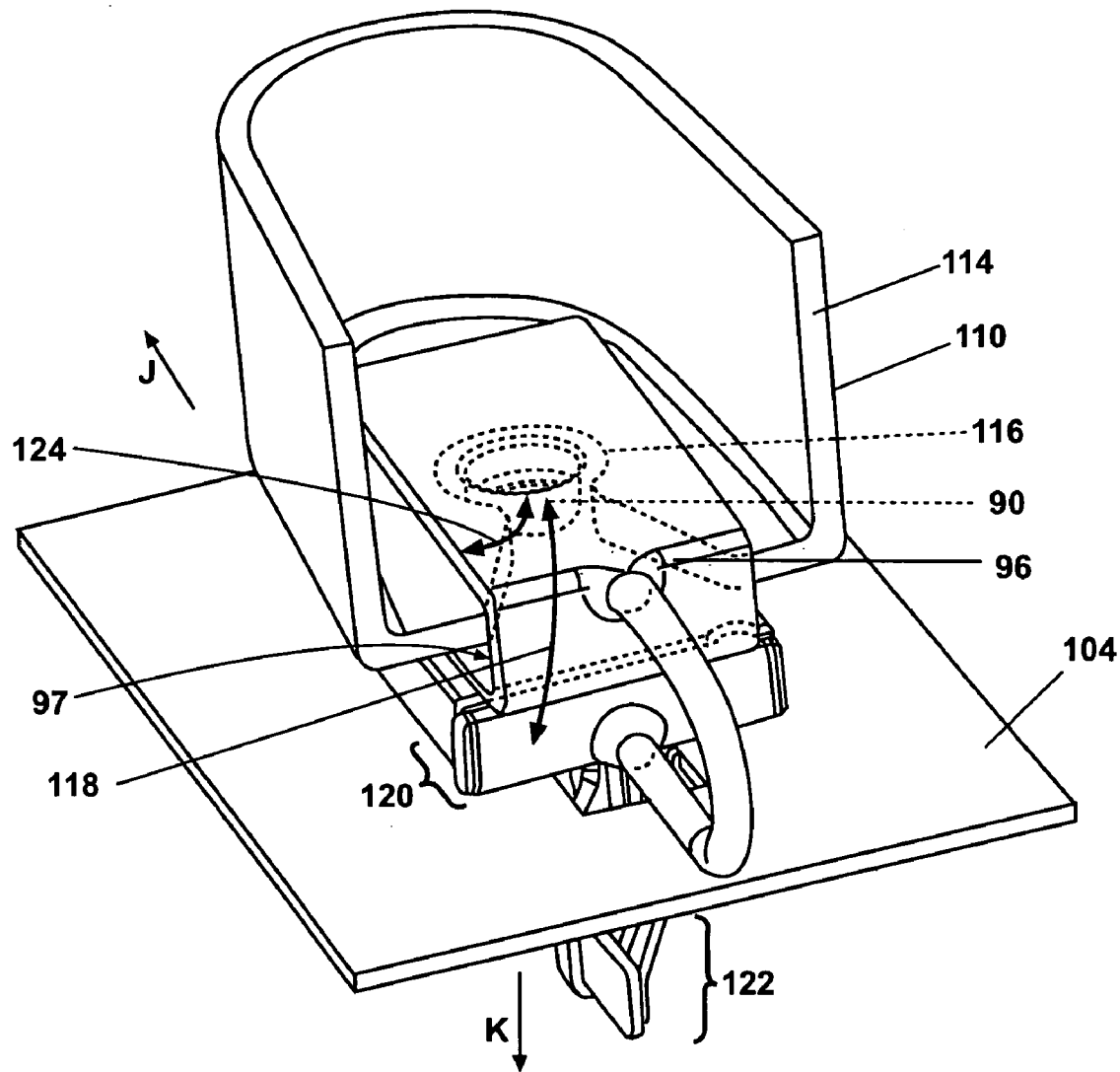
FIG. 7 is a rotated perspective view of the assembled fastener of FIG. 6.

Referring generally to FIG. 7, component part 112 has been removed for clarity. An engagement face 114 of doghouse 110 abuts engagement face 97 of connector 12. At the same time, column 90 is engaged with a key slot 116 formed in doghouse 110 by sliding connector 12 in an engagement direction "J" to engage doghouse 110.

Three primary releasable connections are formed when using fastener assembly 10 to join component part 112 to panel 104 of a vehicle. The releasable connections define a sequential or ascending order of joint integral strength. A first releasable connection 118 is formed between pin 26 and stepped member 45. A second releasable connection 120 is formed between metal clip 18 and engagement member 14. A third releasable connection 122 is formed by contact between first deflectable wing 66, second deflectable wing 86, and third deflectable wing 88 of metal clip 18 and panel 104. The retention strength of each of the releasable connections increases from first releasable connection 118 to the third releasable connection 122, wherein each successive releasable connection forms a stronger joint than the joint(s) preceding it. In other words, the first releasable connection intended to disengage or be disengaged in use is first releasable connection 118, followed successively by second releasable connection 120 and third releasable connection 122. One purpose for providing individual joining strengths for each of the releasable connections of the present invention is to allow, for example, a component part such as a trim panel to separate from a body panel of a vehicle in the event that an air bag associated with the trim panel deploys. By designing first releasable connection 118 to separate first, flexible element 16 will continue to retain component part 112 via doghouse 110 to panel 104. Second releasable connection 120 is designed to release after first releasable connection 118 and allows complete separation of component part 112 and panel 104. Second releasable connection 120 is disconnected by either applying sufficient force in a direction opposite to insertion direction "E" or by manual deflection of extension member 58 which allows metal clip 18 to be slidably disengaged past both inclined portion 60 and deflectable end 56 of engagement member 14. The third releasable connection 122 is the strongest connection and is generally intended to be a permanent connection, because it may not be readily accessible after installation, and therefore requires manual deflection of the deflectable wings 66, 86, and 88 prior to removal of metal clip 18 from panel 104.

A fourth releasable connection 124 is also formed between column 90 and key slot 116 of doghouse 110. Fourth releasable connection 124 physically joins doghouse 110 to connector 12. This releasable connection is designed to release within the sequential order after first releasable connection 118 and before second releasable connection 120 to allow repair or replacement of the trim panel.

Figure 8:
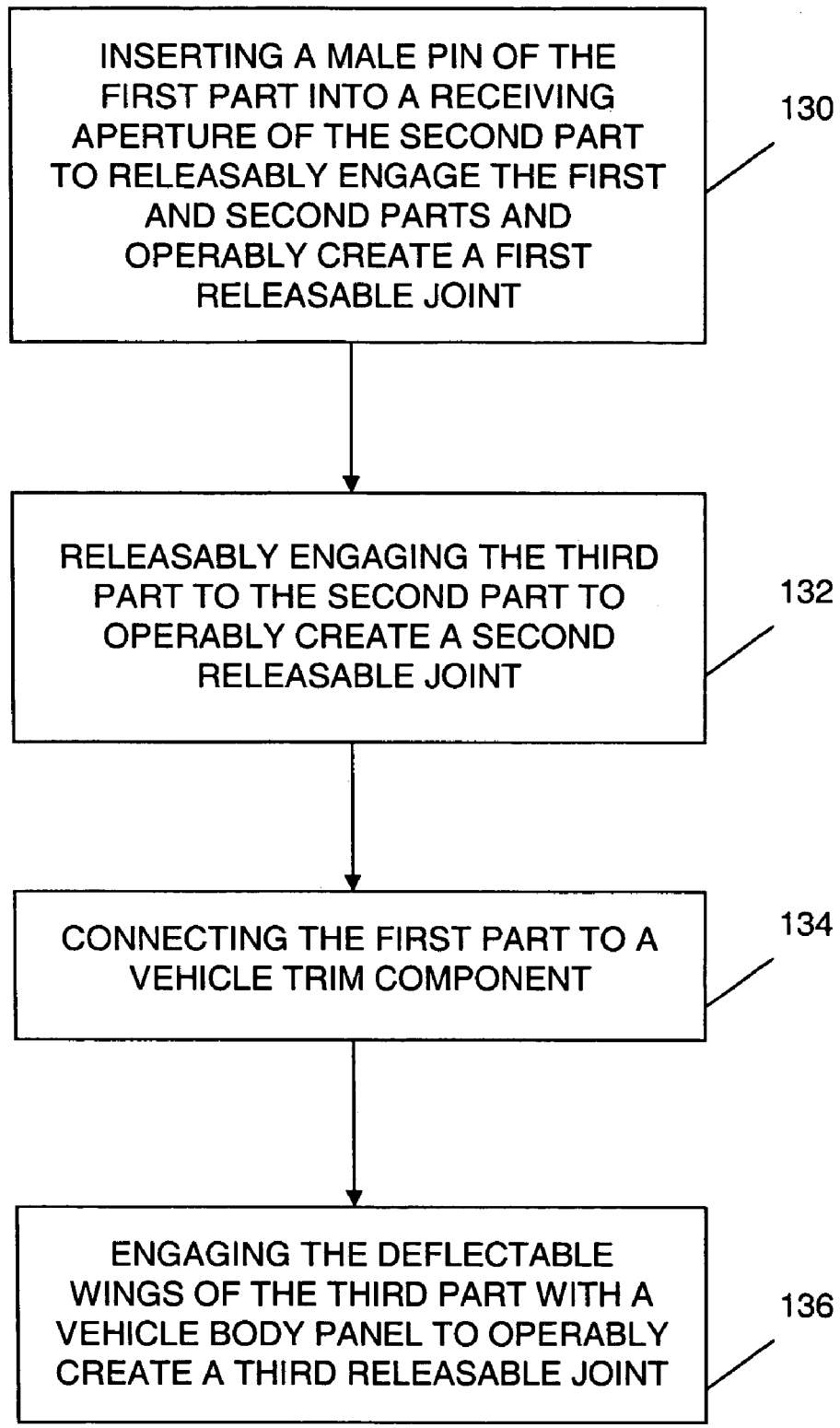
FIG. 8 is a flow diagram of the steps for fastening component parts of an automobile assembly using a multiple engagement joint tethered fastener of the present invention.

Referring to FIG. 8, in a step 130, a male pin of the first part is inserted into a receiving aperture of the second part to releasably engage the first and second parts and operably create a first releasable joint. In a step 132, the third part is releasably engaged to the second part to operably create a second releasable joint. In a step 134, the first part is connected to a vehicle trim component. In a step 136, the deflectable wings of the third part are engaged with a vehicle body panel to operably create a third releasable joint. Each of the first, second and third releasable joints are releasable in a sequential order including the first releasable joint, the second releasable joint, and the third releasable joint.

Figure 9:
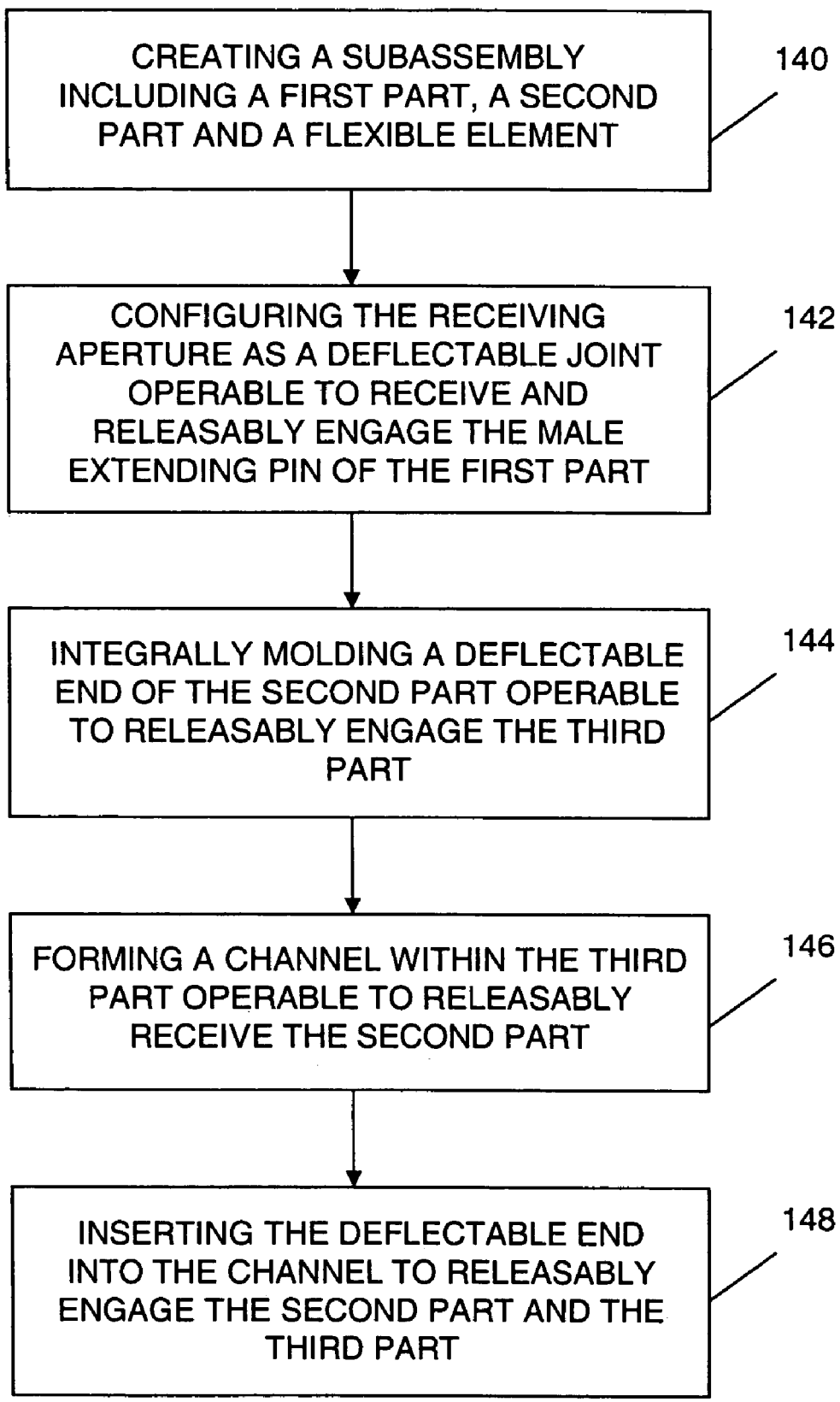
FIG. 9 is a flow diagram of the steps for creating a multiple engagement joint tethered fastener of the present invention.

Referring generally to FIG. 9, in a step 140 a subassembly including a first part, a second part and a flexible element is created. In a step 142, the receiving aperture is configured as a deflectable joint operable to receive and releasably engage a male extending pin of the first part. In a step 144, a deflectable end of the second part operable to releasably engage the third part is integrally molded with the second part. In a step 146, a channel is formed within the third part operable to releasably receive the second part. At a step 148, the deflectable end is inserted into the channel to releasably engage the second part and the third part.

Figure 10:
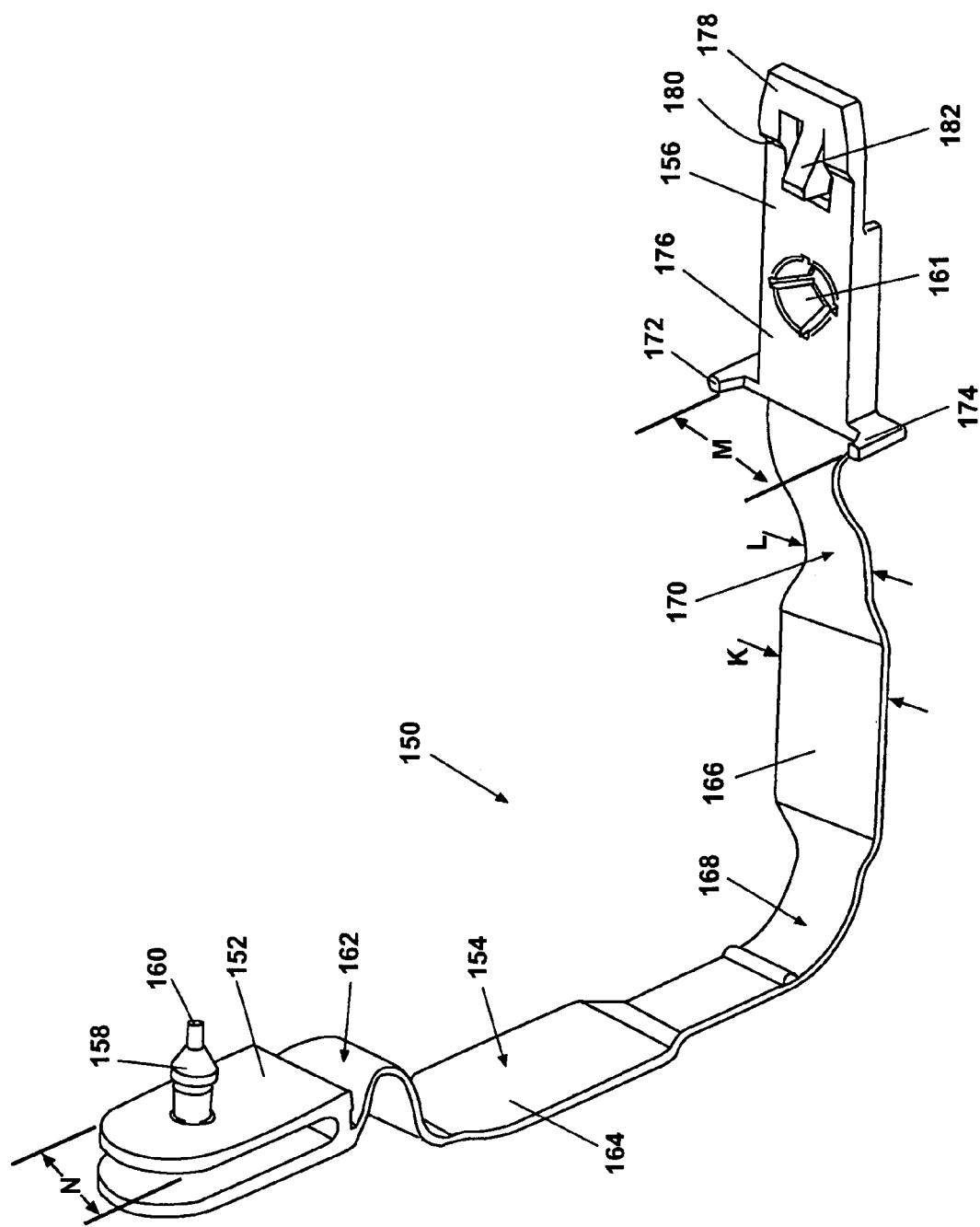
FIG. 10 is a perspective view of another preferred embodiment of the present invention having tether-connected component parts of the fastener.

As best seen in FIG. 10, in another preferred embodiment of the present invention an integrally connected sub-assembly 150 is modified from integrally connected sub-assembly 39 of FIG. 2. Only the differences between sub-assembly 150 and sub-assembly 39 will therefore be discussed. Sub-assembly 150 includes a connector 152 integrally connected by a strap 154 (acting as a tether) to an engagement member 156. Connector 152 includes a pin 158 modified from pin 26 to also include a lead-in member 160. Connector 152 is integrally connected to strap 154 using one or more flexible elements 162. Strap 154 also includes a plurality of wide and narrow sections, shown for example in FIG. 10 as a first major width section 164, a second major width section 166, a first minor width section 168 and a second minor width section 170. The major width sections 164,166 have a strap major width "K" and the minor width sections 168,170 have a strap minor width "L" wherein "K">"L".

Strap 154 is integrally connected to engagement member 156 at an intersection defining a first post 172 and a second post 174. A post clearance width "M" receives connector 152, which includes a connector width "N" sized to mate within post clearance width "M". First and second posts 172,174 provide an anti-rotational feature to prevent connector 152 from rotating with respect to engagement member 156 when pin 158 is received within a stepped member 161 of engagement member 156. Stepped member 161 is otherwise similar to stepped member 45. An exemplary purpose for lead-in member 160 of pin 158 is to improve alignment of pin 158 with stepped member 161 such that connector 152 aligns between first and second posts 172,174 respectively. Engagement member 156 also provides an engagement section 176, a deflectable end 178 connected to engagement section 176 by an inclined junction 180, and a deflectable tab 182.

Figure 11:
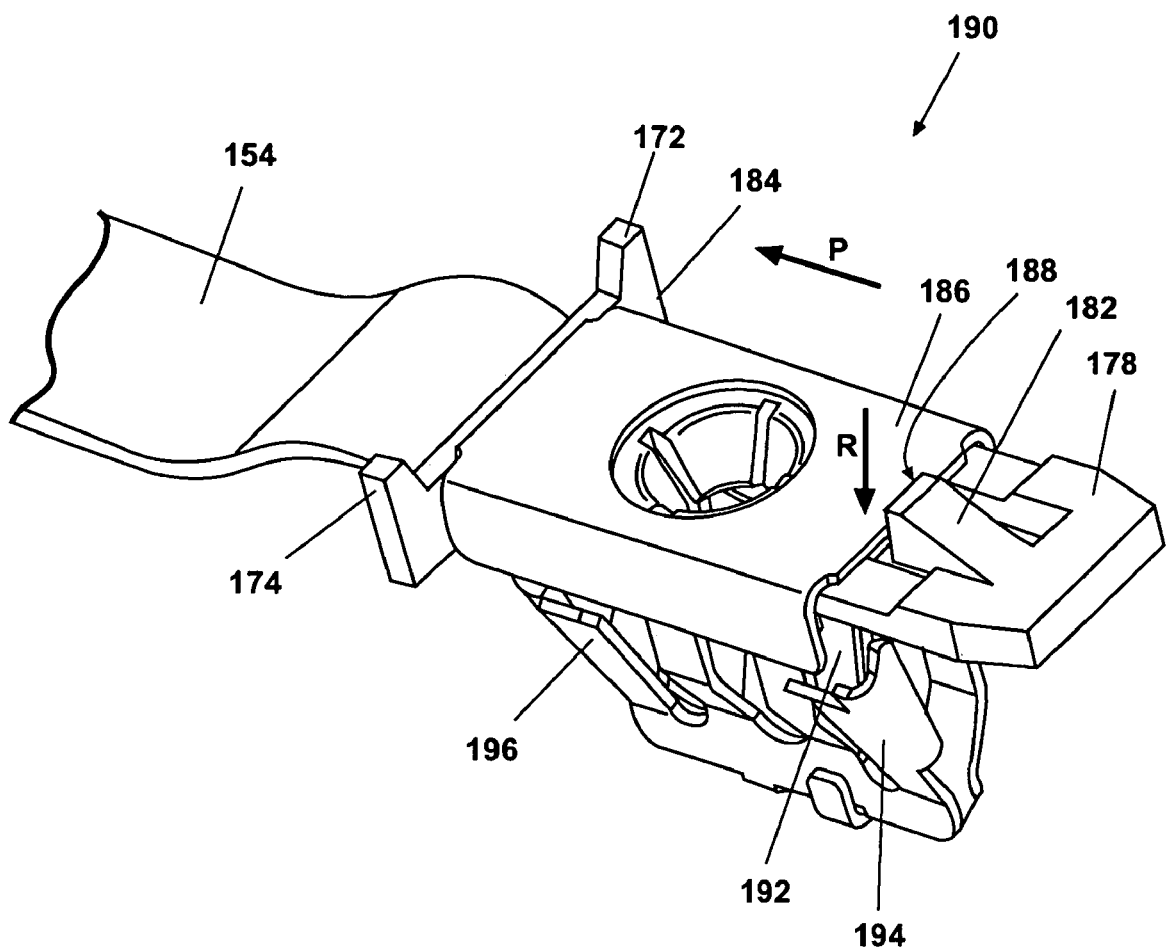
FIG. 11 is a perspective view of an assembly of components of the embodiment of FIG. 10.

Referring finally to FIG. 11, an engagement face 184 defined by first and second posts 172,174 acts as a stop for a clip member 186 (similar to metal clip 18). Clip member 186 is slidably mated with engagement member 156 by sliding in a sliding direction "P". Both deflectable end 178 and deflectable tab 182 are elastically deflected in a deflection direction "R" allowing clip member 186 to reach the installed position shown in FIG. 11. Both deflectable end 178 and deflectable tab 182 spring back by elastic force such that clip member 186 is retained between a tab face 188 of deflectable tab 182 and engagement face 184. Thereafter, deflectable tab 182 must be deflected in the deflection direction "R" to remove clip member 186. Deflectable tab 182 therefore provides an increased retention capability compared to the embodiment shown in FIG. 1.

The shape of strap 154 and the mating features of sub-assembly 150 limit the amount of relative twisting between connector 152 and engagement member 156 compared to the embodiment of FIG. 1, which in the example shown uses a relatively circular-shaped flexible element 16 as a tether. Other shapes can be used for either strap 154 or flexible element 16, including but not limited to polygonal, rectangular, square, oval, continuous width, etc. The invention is not limited by the shape of either strap 154 or flexible element 16 shown. Materials for sub-assembly 150 and clip member 186 are similar to materials for fastener assembly 10. Clip member 186 can also be manufactured of a composite or polymeric material providing the material used retains the hierarchy of joint strength of fastener assembly 190.

Similar to fastener assembly 10, a fastener assembly 190 including connector 152, engagement member 156 and clip member 186 provides a hierarchy of joint strengths. A relative joint strength in ascending order of fastener assembly 190 includes a first joint created between pin 158 of connector 152 and stepped member 161 of engagement member 156. A second joint is created when clip member 186 is received between engagement face 184 and tab face 188. A third joint is created between a plurality of deflectable wings 192, 194 and 196 of clip member 186 and a panel of a vehicle, such as panel 104 shown in FIG. 6.

A fastener assembly of the present invention offers several advantages. By providing multiple releasable connections, each having an individual joint strength which can be configured in ascending or sequential order, events such as an airbag deployment can be accommodated while preventing component parts such as trim panels from completely separating from the vehicle body panel. Further release in a selected order of the releasable connections permits part disassembly, repair or replacement of a part, or complete disassembly of the fastener assembly.

The description of the invention is merely exemplary in nature and, thus, variations that do not depart from the gist of the invention are intended to be within the scope of the invention. For example, as few as two opposed deflectable wings can be used, or a greater number than three deflectable wings can be used. Flexible element 16 can be created as a separate part and connected between connector 12 and engagement member 14, which allows connector 12 and engagement member 14 to be separately created and/or made using different materials to differentiate the releasable connection strength(s). Metal clip 18 can be replaced by a composite or polymeric material part. Such variations are not to be regarded as a departure from the spirit and scope of the invention.

What is claimed is:

1. A releasable fastener, comprising:
   a first member having first and second planar-shaped portions; both connected at a distal end by a joining end, the first planar portion; having a male pin extending therefrom;
   a second member having a receiving aperture and at least one biasing element operable to releasably engage the male pin;
   a column homogenously connected between the first and second portions and spatially separated from the joining end, the column operable to define a standoff distance between the first and second portions;
   a flexible element homogenously connecting the second member to the first member, the flexible element operable to allow the male pin to be co-axially aligned with the receiving aperture;
   a third member releasably engageable with the second member, the third member having a clearance aperture alignable with the receiving aperture of the second member; and
   wherein the male pin is displaceable through the clearance aperture and into the receiving aperture to releasably join the first, second and third members.

2. The fastener of claim 1, wherein the male pin further comprises:
   a bulbous head; and
   a stem joining the bulbous head to the first portion;
   wherein the bulbous head is operable to elastically displace the biasing element during insertion of the male pin into the receiving aperture, the biasing element subsequently engaging the stem to releasably retain the male pin.

3. The fastener of claim 1, wherein the second member further comprises:
   a shoulder operable to engage an abutment end of the third member; and
   a deflectable end positioned opposite to the shoulder and operable to rotate from a non-deflected position about an arc to releasably receive the third member and elastically return to the non-deflected position.

4. The fastener of claim 1, wherein the third member further comprises a plurality of deflectable wings.

5. The fastener of claim 1, wherein the third member comprises a metallic material.

6. The fastener of claim 1, wherein each of the first member, the second member and the flexible element comprise a polymeric material.

7. The fastener of claim 1, comprising an integrally connected subassembly including the first member, the second member and the flexible element.

8. The fastener of claim 1, wherein the flexible element comprises a strap having a plurality of strap widths.

9. The fastener of claim 1, further comprising an engagement face of the joining end facing the column, wherein the flexible element is homogenously connected to the joining end opposite to the engagement face.

10. The fastener of claim 2, wherein the male pin further comprises a lead-in element operable to align the male pin with the receiving aperture.

11. The fastener of claim 3, wherein the second member further comprises first and second posts separated by a post separation width, wherein the first member is non-rotatably receivable between the first and second posts.

12. The fastener of claim 3, wherein the second member further comprises a deflectable tab, wherein the deflectable tab is elastically deflectable to receive the third member and returns by spring force to retain the third member.

13. The fastener of claim 4, wherein the plurality of deflectable wings comprises a first, a second and a third deflectable wing, the first deflectable wing opposing both the second and the third deflectable wings.

14. The fastener of claim 13, wherein the third member further comprises:
   a first frame having the first deflectable wing extending therefrom;
   a second frame having the second and the third deflectable wings extending therefrom; and
   a receiving channel defined between the first frame and the second frame operable to receive the second member.

15. The fastener of claim 14, further comprising:
   a first cross member of the first frame; and
   a second cross member of the second frame mechanically connectable to the first cross member.

16. The fastener of claim 6, wherein the polymeric material comprises a polyamide material.

17. The fastener of claim 12, further comprising an inclined portion connecting the deflectable tab and the deflectable end, the inclined portion operable to releasably engage the third member.

18. A fastener system, comprising:
   a fastener, including:
      a substantially U-shaped first member including opposed first and second planar portions; each connected at a distal end by a joining end, the first planar portion having a male extending pin;
      a column homogeneously connected between the first and second planar portions; and spatially separated from the joining end, the column operable to define a standoff distance between the first and second portions;
      a second member homogenously connected to the first member by a flexible tether, the second member having a deflectable end; and
      a third member defining a channel and an extending portion, the channel slidably engageable with the second member via the deflectable end;
   a vehicle component engageable with the column of the U-shaped member between the first and second planar portions;
   a vehicle panel having an aperture operable to receive the extending portion of the third member; and
   a plurality of connections releasable in a sequential order.

19. The system of claim 18, wherein the plurality of connections further comprises:
   a first connection operatively created between the pin and a receiving aperture of the second member;
   a second connection operably created between the third member and the second member; and
   a third connection operably created between the third member and the vehicle panel upon insertion of the third member into the aperture of the vehicle panel;
   wherein the sequential order defines in sequence the first connection, the second connection and the third connection.

20. The system of claim 18, wherein the extending portion of the third member comprises a plurality of deflectable wings biased into engagement with the vehicle panel when the extending portion is operably received in the aperture of the vehicle panel.

21. The system of claim 19, wherein a joint strength of each of the first, the second and the third connections increases in an ascending order defining in sequence the first connection, the second connection and the third connection.

22. The system of claim 19, wherein the pin comprises a pin axis extending substantially transverse to a plane of the first portion.

23. The system of claim 19, wherein the receiving aperture further comprises a plurality of stepped deflecting members biased to engage the pin.

24. The system of claim 19, comprising:
   a fourth connection operatively created between the U-shaped first member and the vehicle component;
   wherein the fourth connection is positionable within the sequential order defines between the first connection and the second connection.

25. The system of claim 20, comprising:
   a doghouse connectable to the vehicle component; and
   a key slot created in the doghouse operable to receive and releasably engage the column.

* * * * *